United States Patent
Kyotani (10) Patent No.: US 9,938,088 B2
(45) Date of Patent: Apr. 10, 2018

(54) CONVEYING DEVICE

(71) Applicant: Daifuku Co., Ltd., Osaka (JP)

(72) Inventor: Hisashi Kyotani, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/298,878

(22) Filed: Oct. 20, 2016

(65) Prior Publication Data

US 2017/0137228 A1 May 18, 2017

(30) Foreign Application Priority Data

Nov. 12, 2015 (JP) .................. 2015-222202

(51) Int. Cl.
| | | |
|---|---|---|
| B65G 35/06 | (2006.01) | |
| B65G 35/00 | (2006.01) | |
| B65G 33/04 | (2006.01) | |
| B65G 33/32 | (2006.01) | |
| B65G 21/22 | (2006.01) | |

(52) U.S. Cl.
CPC ........... *B65G 35/066* (2013.01); *B65G 21/22* (2013.01); *B65G 33/04* (2013.01); *B65G 33/32* (2013.01); *B65G 35/00* (2013.01); *B65G 35/06* (2013.01)

(58) Field of Classification Search
CPC .............................. B65G 35/066; B65G 35/06
See application file for complete search history.

(56) References Cited

U.S. PATENT DOCUMENTS 8,272,500 B2 * 9/2012 Nishikawa ........... B65G 35/066
198/465.1
9,382,074 B2 * 7/2016 Nishikawa ........... B65G 35/066

FOREIGN PATENT DOCUMENTS

JP 2011173549 A 9/2011
WO WO 2014/103453 * 9/2013 ............. B65G 35/06

* cited by examiner

*Primary Examiner* — Thomas Randazzo
(74) *Attorney, Agent, or Firm* — St. Onge Steward Johnston & Reens LLC (57) ABSTRACT

A conveying device has interlockingly coupled, rectilinear screw shafts which are driven by a motor. The screw shafts are juxtaposed to an inclined rectilinear portion of a gradient portion in a traveling route of a conveying traveling body and to at least fixed regions adjacent to the gradient portion of respective upper and lower horizontal route portions connected to respective ends of the gradient portion. The conveying traveling body has a pair of front and rear driven rollers engaging with the screw shafts, and an interval between the pair of front and rear driven rollers is set to a length not shorter than a rectilinear distance between end portions of the screw shafts positioned at respective sides of each of arcuate portions at respective upper and lower ends of the gradient portion to make the conveying traveling body travel continuously between the respective upper and lower horizontal route portions.

5 Claims, 12 Drawing Sheets

CONVEYING DEVICE

FIELD OF THE INVENTION

The present invention relates to a conveying device that propels a conveying traveling body along a traveling route by means of a screw shaft juxtaposed to the traveling route and a driven roller pivotally supported at the conveying traveling body so as to engage with the screw shaft.

BACKGROUND OF THE INVENTION

A screw drive type conveying device, that is, a screw drive type conveying device, which propels a conveying traveling body along a traveling route by means of a motor-driven screw shaft juxtaposed along the traveling route and a driven roller pivotally supported at the conveying traveling body so as to engage with the screw shaft, is known, for example, by Japanese Unexamined Patent Application Publication No. 2011-173549 (Patent Literature 1).

SUMMARY OF THE INVENTION

However, for a case where a gradient route portion is present in a traveling route, a screw drive type driving means has not been known as a driving means that propels a conveying traveling body in the gradient route portion. A force in a descending direction due to gravity acts on a conveying traveling body traveling in the gradient route portion, and therefore, for example with a driving means of a wheel drive type, with which a wheel that is pivotally supported at the conveying travelling body is driven by a motor, or a friction drive type, with which a motor-driven friction drive wheel at the traveling route side is put in press contact with a friction surface provided at the conveying traveling body to propel the conveying traveling body, the conveying traveling body of a conveying device, with which an entirety of the conveying traveling body including a loaded conveyed object is of large size and large weight, cannot be driven to travel reliably while maintaining a predetermined speed at a gradient route portion, especially a gradient route portion of large gradient angle due to occurrence of slipping of the drive wheel or the friction drive wheel.

The present invention proposes a conveying device capable of solving the problems of the conventional art such as the above, and to describe by providing reference symbols in parentheses used in the description of embodiments below to facilitate understanding the relationship with the embodiments, the conveying device according to the present invention has a configuration where a gradient route portion (5) is provided in a traveling route of a conveying traveling body (2 or 36), rectilinear screw shafts (21 to 23), which are interlockingly coupled to each other and driven by a motor, are juxtaposed to an inclined rectilinear portion (5C) of the gradient route portion (5) and to at least fixed regions adjacent to the gradient route portion (5) of respective upper and lower horizontal route portions (3 and 4) connected to respective ends of the gradient route portion (5), the conveying traveling body (2 or 36) is provided, in a traveling direction of the conveying traveling body (2 or 36), with a pair of front and rear driven rollers (19 and 20) engaging with the screw shafts (21 to 23), and an interval (D) between the pair of front and rear driven rollers (19 and 20) is set to a length not shorter than a rectilinear distance (L1) between an end portion of an inclined screw shaft (23), juxtaposed to the gradient route portion (5), and an end portion of a horizontal screw shaft (21 or 22), juxtaposed to a horizontal route portion (3 or 4), that are positioned at respective sides of an arcuate portion (5A or 5B) at either of respective upper and lower ends of the gradient route portion (5) so that the conveying traveling body (2 or 36) travels continuously between the respective upper and lower horizontal route portions (3 and 4) via the gradient route portion (5) by means of each of the rotatingly driven screw shafts (21 to 23) and at least one of the driven rollers (19 and 20).

With the conveying device according to the present invention described above, when the conveying traveling body transfers from one to the other of a horizontal route portion and the gradient route portion, the driven roller at the front side disengages from an end of one of either the horizontal screw shaft at the horizontal route portion side or the inclined screw shaft at the gradient route portion side and thereafter, the conveying traveling body receives a propulsive force from the one of either the horizontal screw shaft or the inclined screw shaft via the driven roller at the rear side and enters the arcuate portion, connecting the horizontal route portion and the gradient route portion. When the driven roller at the rear side then disengages from the end of the one of either the horizontal screw shaft or the inclined screw shaft, the driven roller at the front side is engaged with an end of the other of either the horizontal screw shaft or the inclined screw shaft so that at this point, a propulsive force is received from the other of either the inclined screw shaft or the horizontal screw shaft via the driven roller at the front side and the inclined rectilinear portion of the gradient route portion or the horizontal route portion is entered from the arcuate portion. When the conveying traveling body travels in the horizontal route portion with the horizontal screw shaft juxtaposed or the inclined rectilinear portion of the gradient route portion with the inclined screw shaft juxtaposed, at least one of the pair of front and rear driven rollers engages with either of the screw shafts to receive the propulsive force.

As described above, with the configuration of the present invention, the propulsive force of a screw shaft is always received by at least one of the pair of front and rear driven rollers so that the conveying traveling body can travel continuously from one to the other of the respective upper and lower horizontal route portions, connected by the gradient route portion, at a fixed speed determined by a rotational speed of the screw shafts, and at each of the arcuate portions present at both the upper and lower ends of the gradient route portion, the driven roller is not required to be engaged with a screw shaft so that a special screw shaft with flexibility capable of rotation around its own axis in a state of being curved along the arcuate portion is unnecessary and a configuration using just general, rectilinear rod-shaped screw shafts is made possible.

Specifically, in implementing the present invention, it is preferable that the end portion of the inclined screw shaft (23) at the arcuate portion (5A or 5B) side and the end portion of the horizontal screw shaft (21 or 22) at the arcuate portion (5A or 5B) side are extended so as to be disposed inside a fan-shaped region (SA) between two virtual rectilinear lines joining an arc center of the arcuate portion (5A or 5B) and respective ends of the arcuate portion (5A or 5B) in side view so that the rectilinear distance (L1) between the screw shaft end portions at the arcuate portion (5A or 5B) sides is configured to be shorter than a rectilinear distance (L2) between intersections (P) at which the respective screw shafts ((21 and 23) or (23 and 22)) contact the fan-shaped region (SA) and the interval (D) between the pair of front and rear driven rollers (19 and 20) is set to be of a length shorter than the rectilinear distance (L2) between the intersections (P) but not shorter than the rectilinear distance (L1) between the end portions of the screw shafts ((21 and 23) or (23 and 22)). That is, although the end portion of the inclined screw shaft at the arcuate portion side and the end portion of the horizontal screw shaft at the arcuate portion side may be configured to be at positions contacting the fan-shaped region, in this case, the interval between the pair of front and rear driven rollers also cannot be made shorter than an interval between the end portions of the respective screw shafts so that the interval between the pair of front and rear driven rollers becomes large. This means that even in circumstances where the interval between the pair of front and rear driven rollers may, in principle, be narrowed to make a total length of the conveying traveling body short, the total length of the conveying traveling body must be made long in accordance with the length of the arcuate portion so that the conveying traveling body becomes long and a storage route length becomes long to cause weight increase and cost increase. However, by configuring as described above, it becomes possible to narrow the interval between the pair of front and rear driven rollers in spite of the length of the arcuate portion and configure the conveying traveling body to be short.

Also, although it is possible to juxtapose a screw shaft at a lower side or an upper side of the traveling route of the conveying traveling body, it is preferable that the pair of front and rear driven rollers (19 and 20) are pivotally supported at lateral portions of the conveying traveling body (2 or 36) by horizontal support shafts directed orthogonal to the traveling direction of the conveying traveling body (2 or 36) and the respective screw shafts (21 to 23) are aligned at lateral sides of the conveying traveling body (2 or 36). In this case, the conveying traveling body (2 or 36) may have configuration including a main body (7 or 40) and a pair of front and rear trolleys ((11 and 12) or (38 and 39)) that are supported to be movable while being kept in a fixed orientation with respect to a guide rail (1 or 37) constituting the traveling route of the conveying traveling body (2 or 36) and the respective trolleys ((11 and 12) or (38 and 39)) may be pivotally supported at two locations at a front and rear of the main body (7 or 40) so as to be swingable to the front and rear around right-left laterally oriented horizontal support shafts (16 or 43).

Configuring the conveying traveling body as described above enables adoption of a configuration where the pair of front and rear driven rollers are pivotally supported by the main body at positions above the horizontal support shafts pivotally supporting the respective trolleys or a configuration where the pair of front and rear driven rollers are supported by lateral side extension ends of the horizontal support shafts pivotally supporting the respective trolleys, etc. Further, the pair of front and rear trolleys (38 and 39) may have wheels (44), which are rollable on a supporting rail surface of the guide rail (37), provided concentric to the horizontal support shafts (43), at least one of the trolleys (39) may be provided with a motor (50) rotatingly driving the wheel (44) included in the trolley (39), the conveying traveling body (36) may be configured to be capable of self-propulsion in the horizontal route portion in the traveling route by means of the motor-driven wheel (44), and the pair of front and rear driven rollers (19 and 20) may be pivotally supported concentrically to the wheels (44) of the pair of front and rear trolleys (38 and 39).

BRIEF DESCRIPTION OF THE DRAWINGS

FIG. 1 to FIG. 6 are diagrams showing a first embodiment, and

FIG. 7A to FIG. 12 are diagrams showing a second embodiment.

DETAILED DESCRIPTION OF THE INVENTION

To describe a first embodiment based on FIG. 1 to FIG. 6, a traveling route for conveying traveling bodies 2 that is configured from guide rails 1 is provided with a gradient route portion 5 connecting an upper horizontal route portion 3 and a lower horizontal route portion 4. In the present embodiment, the conveying traveling bodies 2 travel from the upper horizontal route portion 3 to the lower horizontal route portion 4 via the gradient route portion 5. Each conveying traveling body 2 is constituted from a main body 7, which is long in a front/rear traveling direction and has a conveyed object supporting portion 6 provided at an upper side, a pair of front and rear supporting column members 8 and 9, disposed to continue vertically downward from width direction center positions of respective front and rear ends of the main body 7, a friction drive load bar 10, being continuous across a total length of the conveying traveling body 2 and coupling lower end vicinity positions of the pair of front and rear supporting column members 8 and 9 to each other, and a pair of front and rear trolleys 11 and 12 mounted to lower ends of the pair of front and rear supporting column members 8 and 9 at a lower side of the load bar 10. The gradient route portion 5 is constituted from an upper end arcuate portion 5A, a lower end arcuate portion 5B, and an inclined rectilinear portion 5C connecting both arcuate portions 5A and 5B. In other words, the guide rails 1 constituting the gradient route portion 5 are divided into the respective upper and lower arcuate portions 5A and 5B and the inclined rectilinear portion 5C. Although the configuration of the conveyed object supporting portion 6 is not restricted in particular, if circumstances are such that, due to the reason of an inclination angle of the gradient route portion 5 being large, etc., it is predicted that a loaded conveyed object may slip downward along the inclination when the conveying traveling body 2 is traveling in the gradient route portion 5, a conveyed object supporting portion with a structure capable of securely holding a supported conveyed object at a predetermined position, for example, a conveyed object supporting portion with a structure that houses the conveyed object inside an enclosure, a conveyed object supporting portion with a structure including a locking means that locks the conveyed object at a predetermined position, or a conveyed object supporting portion of any of other various structures may be adopted, in accordance with a size or physical property of the conveyed object, as the conveyed object supporting portion 6.

Figure 4A:
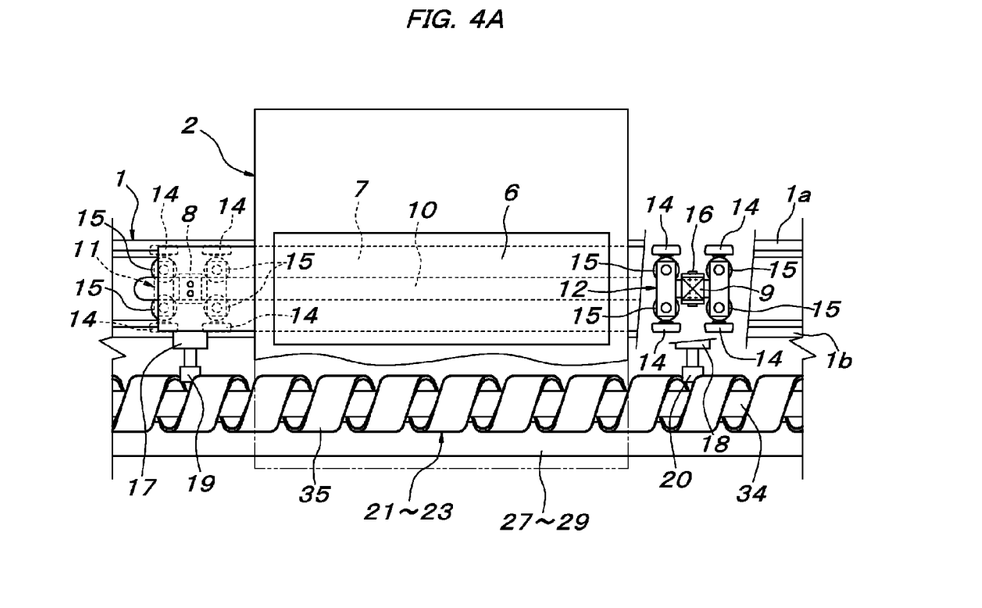
FIG. 4A is a partially cutaway plan view showing a conveying traveling body and a screw shaft on the traveling route.
Figure 4B:
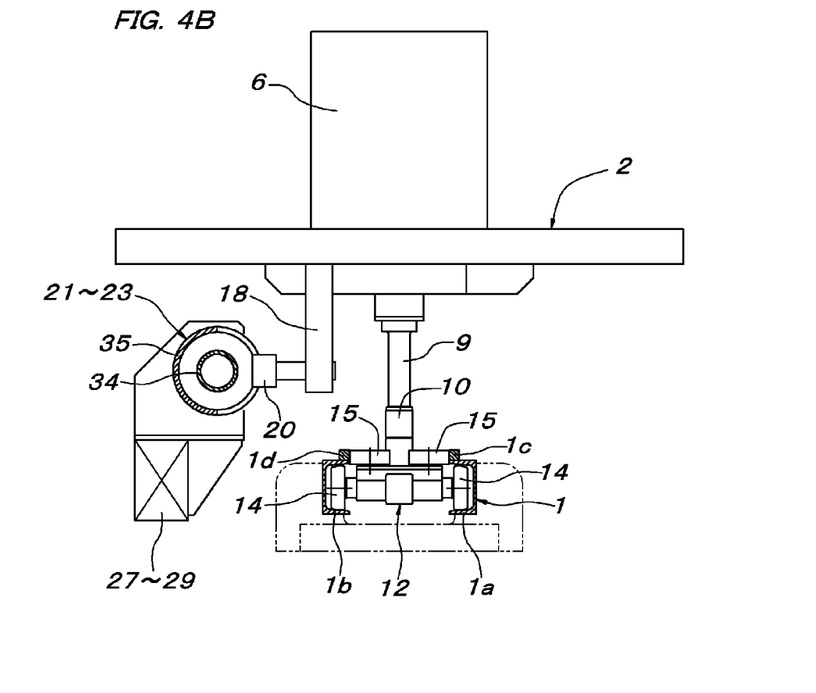
FIG. 4B is a rear view of the same.

Each of the pair of front and rear trolleys 11 and 12 has wheels 14 pivotally supported at both right and left sides of two, front and rear locations and has four positioning rollers 15 respectively pivotally supported by vertical support shafts so as to be positioned at inner upper sides of the four wheels 14, and lower end portions of the pair of front and rear supporting column members 8 and 9 that project downward from the load bar 10 are respectively coupled to the respective trolleys 11 and 12 so as to be swingable relatively to the front and rear by right-left laterally oriented horizontal support shafts 16. Therefore, the guide rails 1 that constitute the traveling route of the conveying traveling body 2 are configured from a pair of right and left channel rails 1a and 1b, to which the respective wheels 14 at both right and left sides of the trolleys 11 and 12 fit respectively, and square bar shaped rail members 1c and 1d attached to upper side faces of the respective channel rails 1a and 1b so that the positioning rollers 15 roll adjacently and are configured to enable the respective trolleys 11 and 12 to move while maintaining a fixed orientation with respect to the guide rails 1. In side view, the horizontal support shafts 16 are disposed at central positions between each pair of front and rear wheels 14 of the respective trolleys 11 and 12 and at the same level as rotational axial centers of the wheels 14, and, in plan view, the supporting column members 8 and 9 are positioned, with respect to the respective trolleys 11 and 12, at central positions of rectangular planes, respectively surrounded by the four wheels 14 of the respective trolleys 11 and 12.

To make the conveying traveling body 2 capable of travel in a horizontal curved route portion as well, vertical support shafts may be interposed in portions of the pair of front and rear supporting column members 8 and 9 penetrating through the load bar 10 and configure the conveyed object supporting main body 7 and the load bar 10 to be relatively rotatable horizontally around the vertical support shafts relative to the respective trolleys 11 and 12.

Upper ends of a pair of front and rear columnar support members 17 and 18, positioned directly beside the supporting column members 8 and 9, are mounted to one side surface of the main body 7 of the conveying traveling body 2 at vicinities of respective front and rear ends thereof, and driven rollers 19 and 20 are pivotally supported cantileveredly at outer sides of lower ends of the respective columnar support members 17 and 18 by right-left laterally oriented horizontal support shafts. The driven rollers 19 and 20 are at positions that are further outward laterally than the guide rails 1 and higher than the load bar 10.

Figure 1:
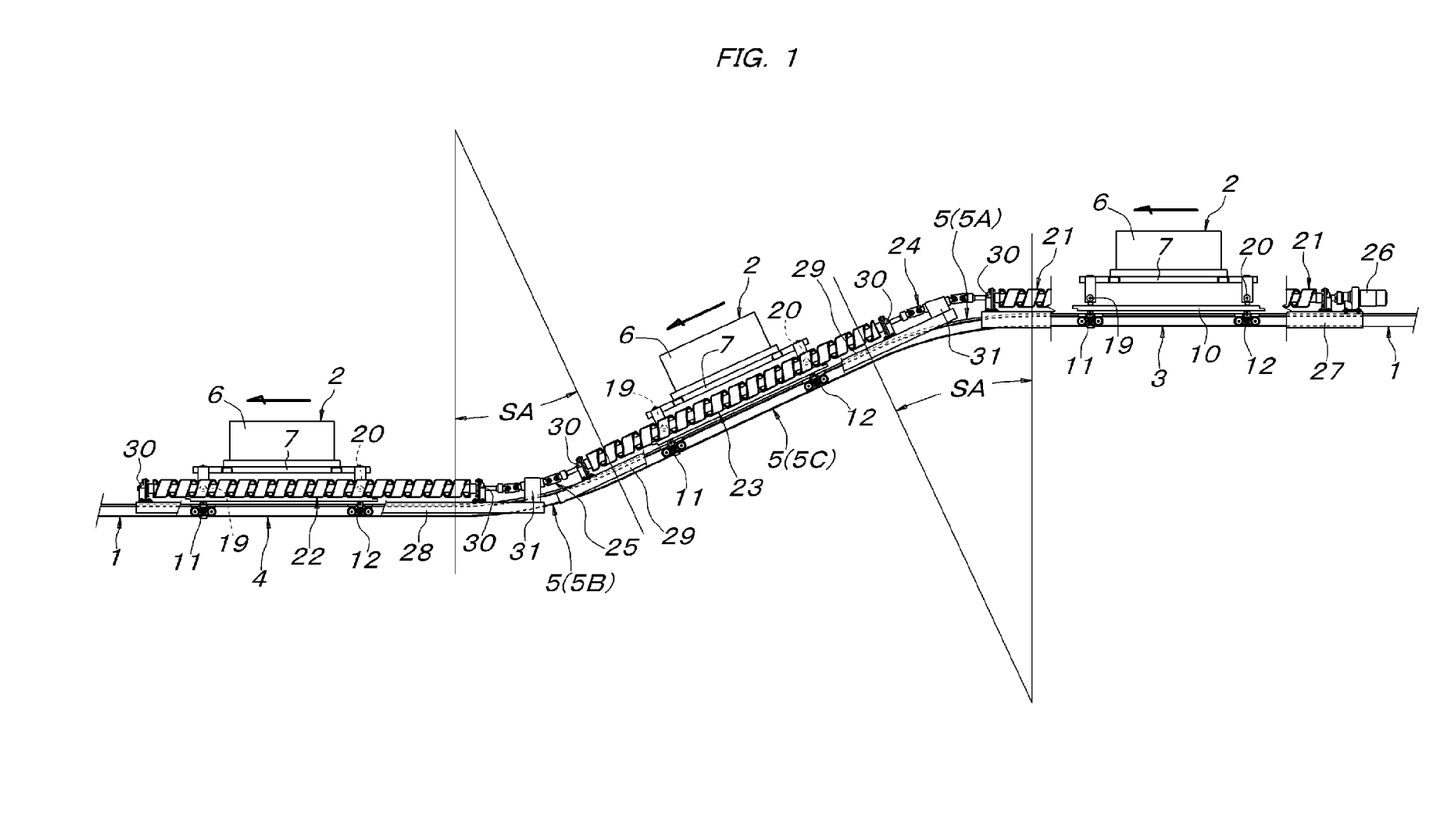
FIG. 1 is a partially cutaway side view showing an essential portion in a traveling route and conveying traveling bodies.
Figure 2:
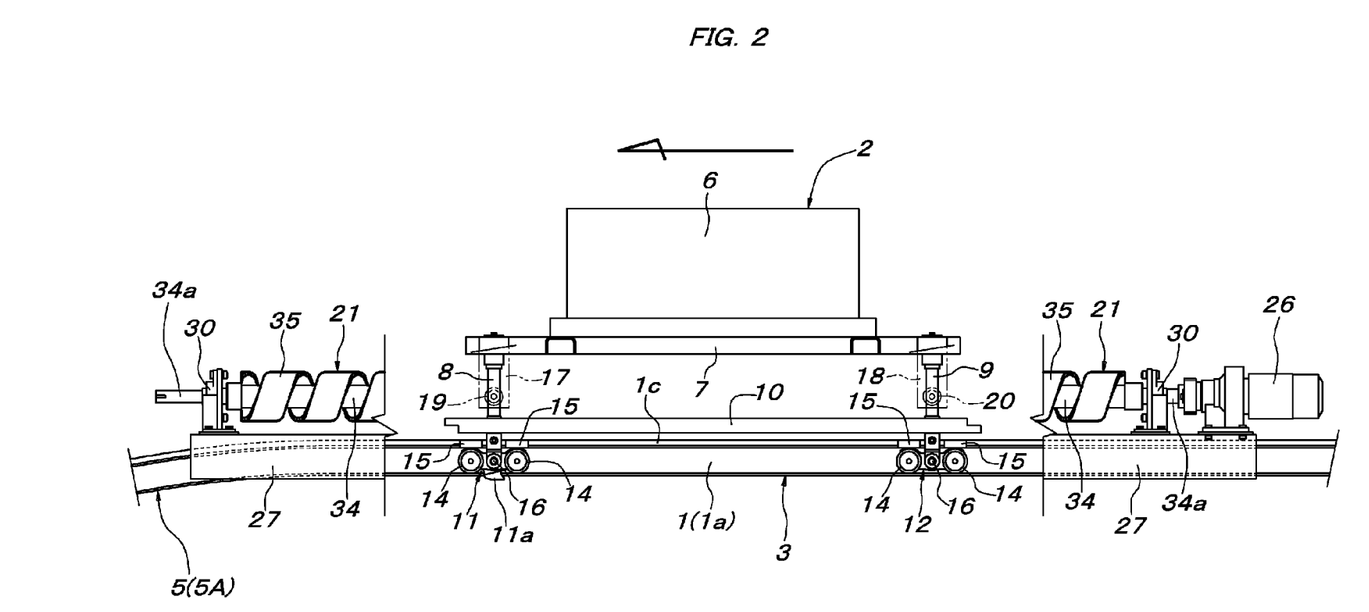
FIG. 2 is an enlarged view of a portion of FIG. 1.
Figure 3:
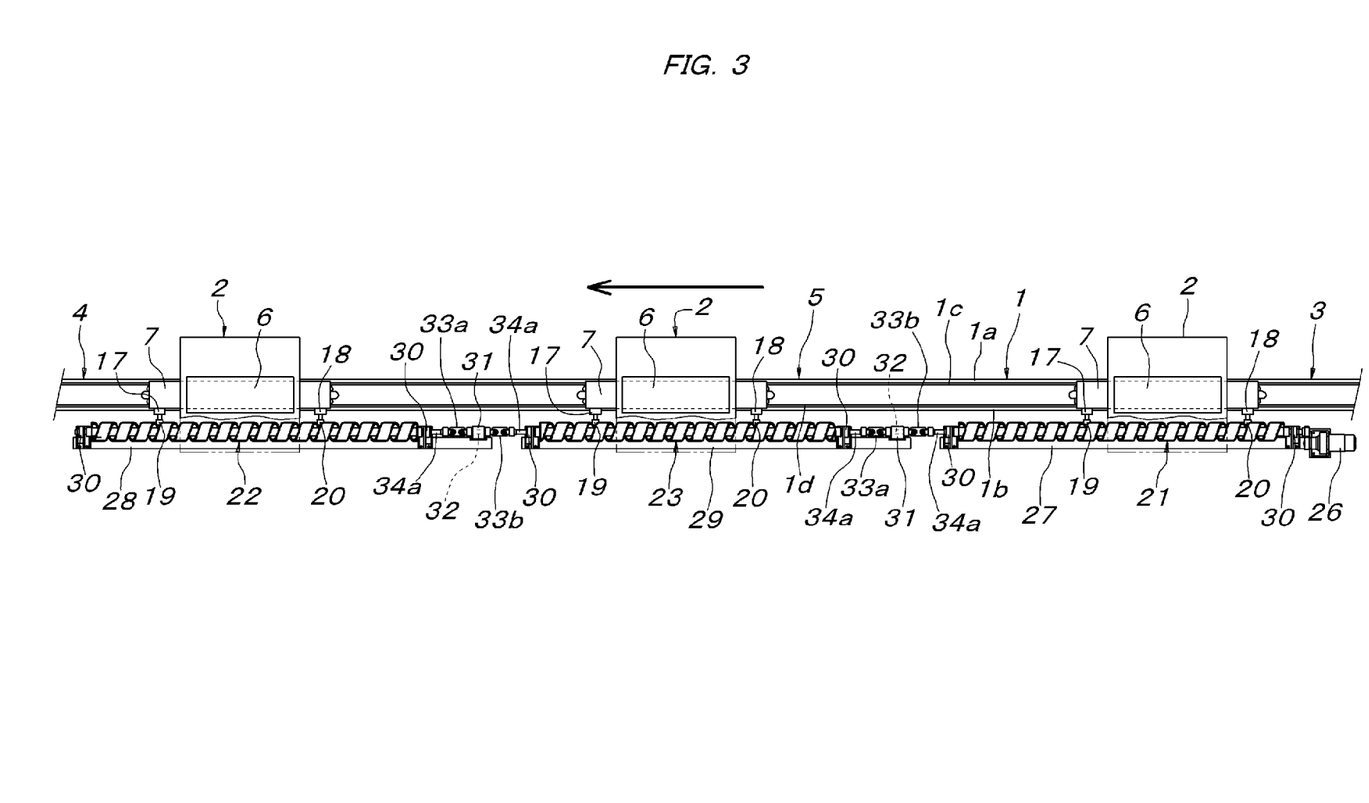
FIG. 3 is a plan view of FIG. 1 in a state where a gradient route portion has been developed on a plane.

As shown in FIG. 1, to an end portion of the upper horizontal route portion 3 adjacent to the gradient route portion 5, to the gradient route portion 5, and to an end portion of the lower horizontal route portion 4 adjacent to the gradient route portion 5, an upper horizontal screw shaft 21, an inclined screw shaft 23, and a lower horizontal screw shaft 22 are juxtaposed in parallel to the guide rails 1 constituting the respective route portions. The respective screw shafts 21 to 23 engage with the front and rear pair of driven rollers 19 and 20 of the conveying traveling body 2 at positions directly besides rotational axial centers of the respective screw shafts 21 to 23 and are interlockingly coupled to each other by transmission means 24 and 25 and, a driving motor 26 is interlockingly coupled to an end portion of the upper horizontal screw shaft 21 at a distal side from the gradient route portion 5.

Figure 5:
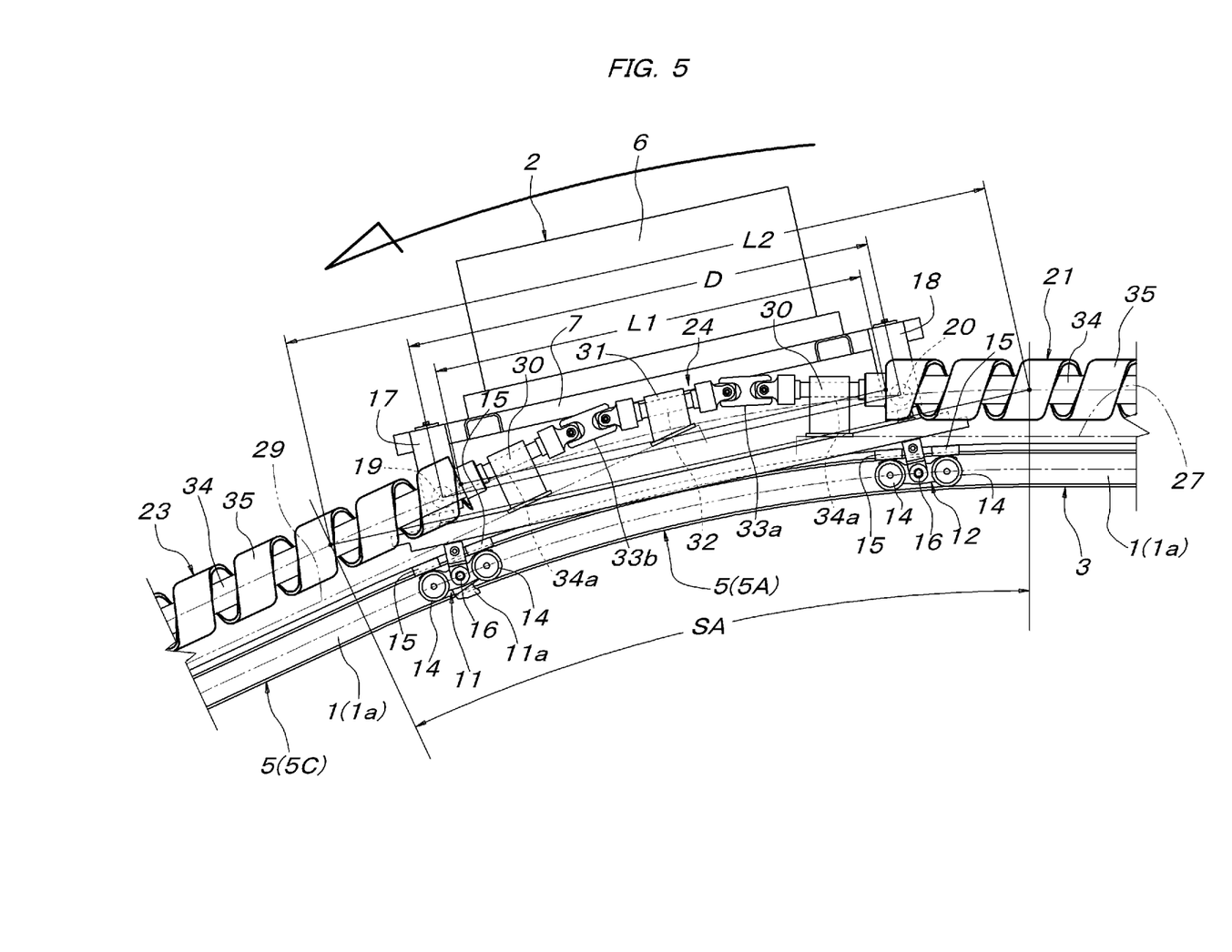
FIG. 5 is a side view for describing a configuration of an upper end arcuate portion of the gradient route portion.
Figure 6:
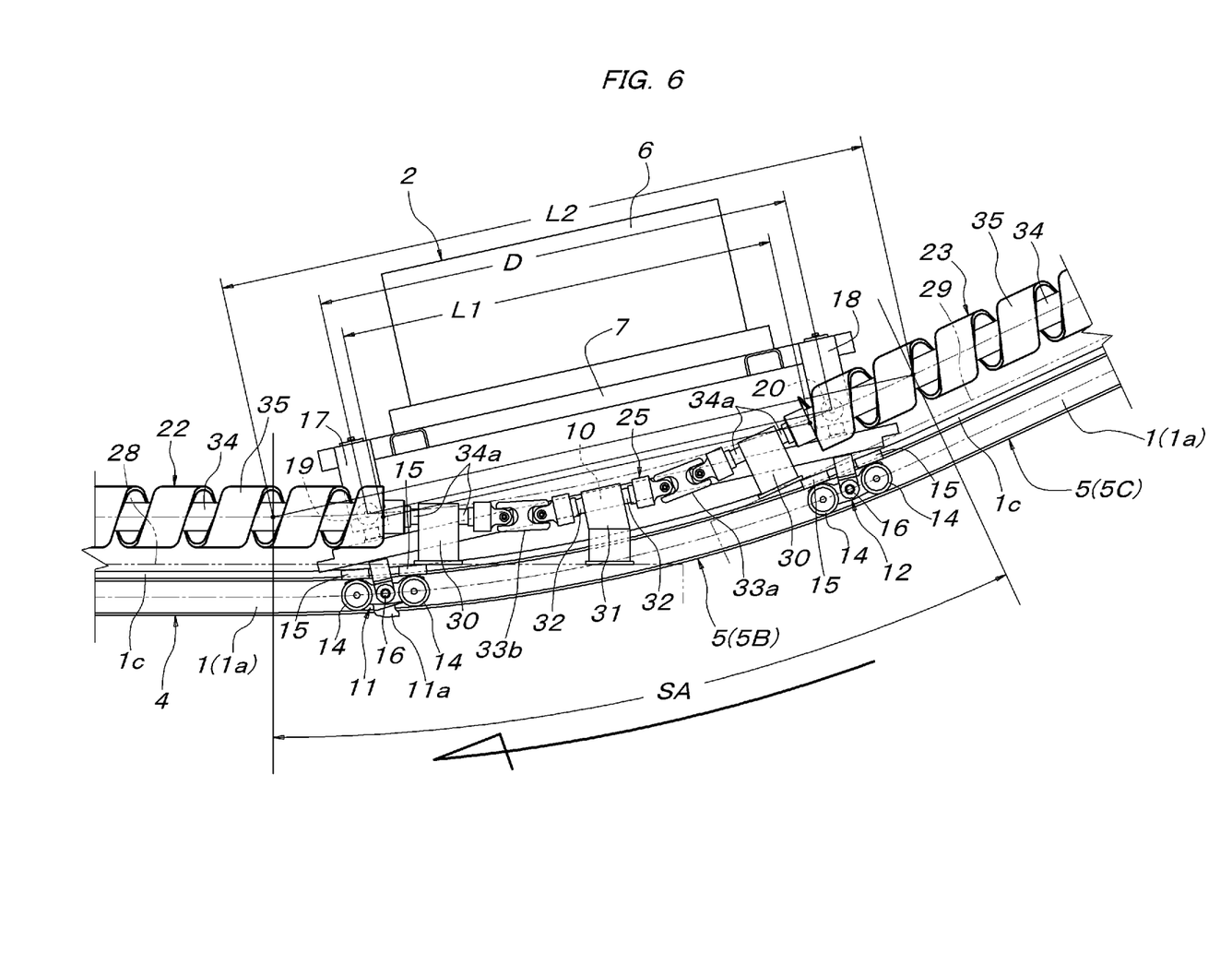
FIG. 6 is a side view for describing a configuration of a lower end arcuate portion of the gradient route portion.
Figures 7A, 7B:
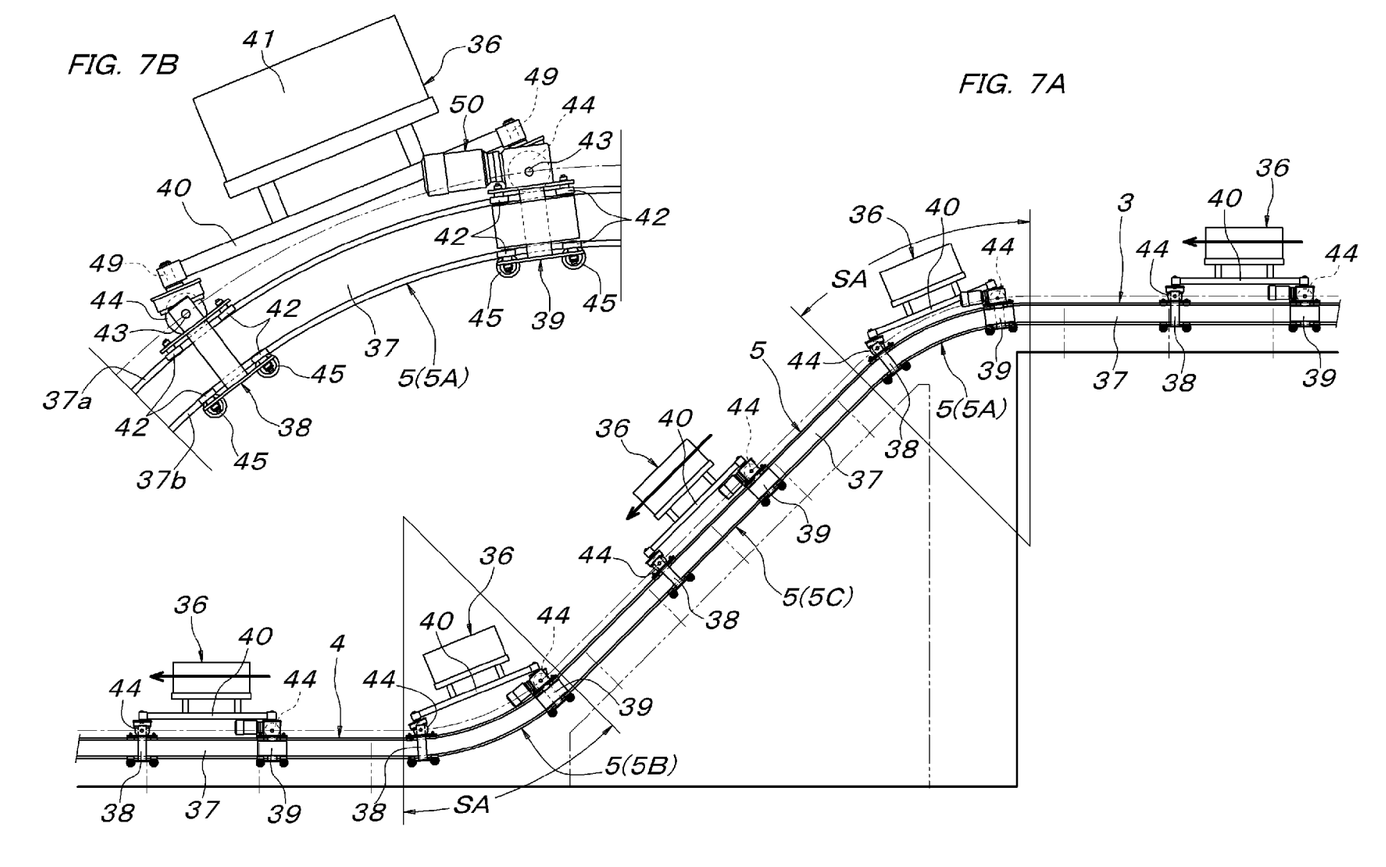
FIG. 7A is a side view showing a guide rail and conveying traveling bodies at an essential portion in a traveling route.
FIG. 7B is an enlarged view of the essential portion.
Figure 8:
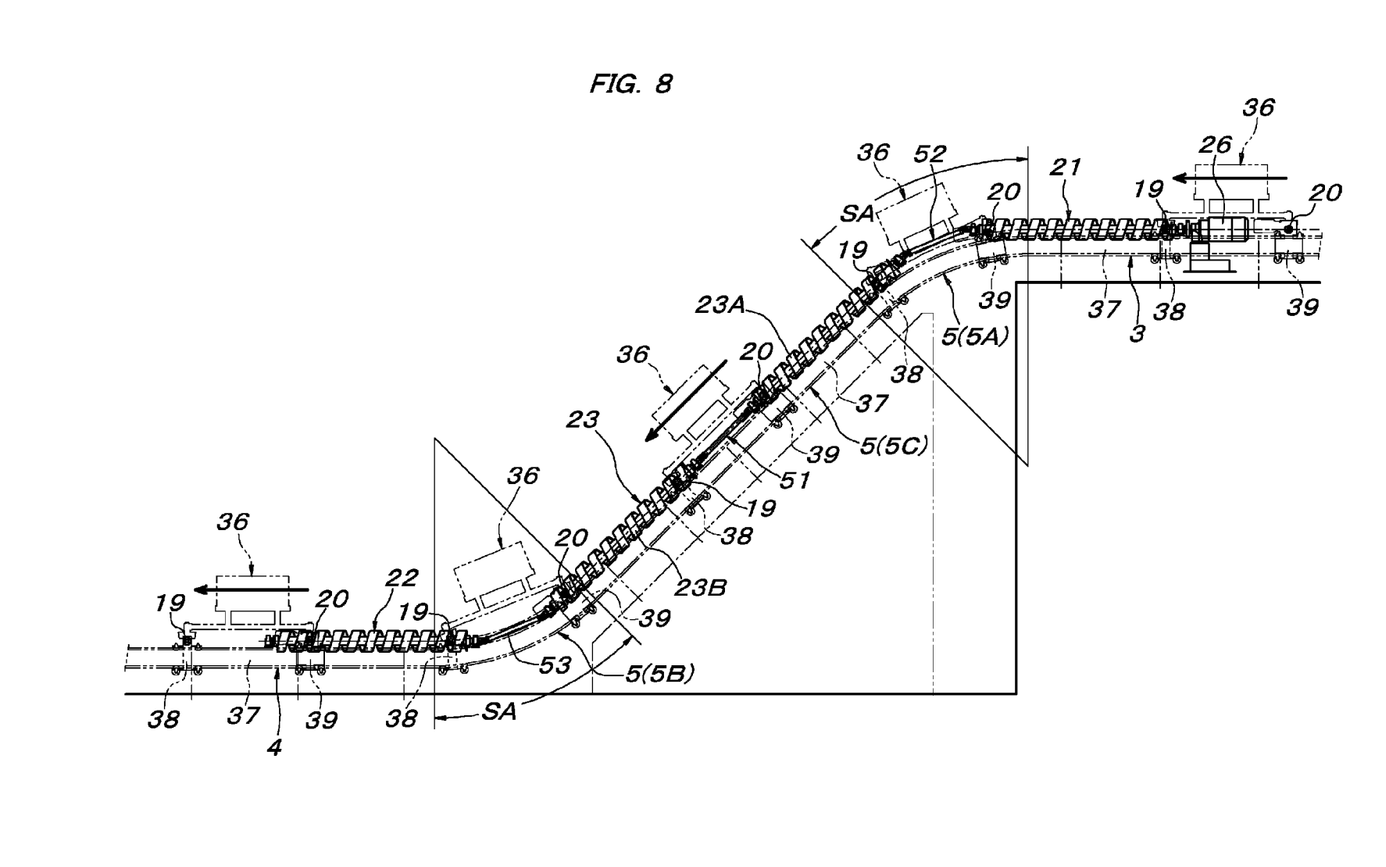
FIG. 8 is a side view of screw shafts that were omitted in FIG. 7A.

The respective screw shafts 21 to 23 have both ends thereof borne by bearings 30 at support frames 27 to 29 respectively. Each of the transmission means 24 and 25 may be of any structure as long as the screw shafts 21 and 23 or 23 and 22 at respective front and rear sides thereof can be interlockingly rotated at the same speed in the same direction and, with the illustrated embodiment, each is constituted of an intermediate transmission shaft 32, which is borne by a bearing 31 so as to be capable of just rotating at a fixed position around its own axis, and universal joint shafts 33a and 33b, each including universal joints at both ends and coupling the intermediate transmission shaft 32 to the screw shafts 21 and 23 or 23 and 22 positioned at respective sides of the intermediate transmission shaft 32 as shown in FIG. 5 and FIG. 6. As each of the screw shafts 21 to 23, for example, that of a conventionally known configuration, where a screw main body 35, constituted of a spirally-wound band plate, is concentrically supported by a shaft tube 34, and supporting shaft portions 34a, borne by the bearings 30, are concentrically disposed in continuation to both ends of the shaft tube 34, may be utilized.

The respective screw shafts 21 to 23 are the same in feed direction and feed pitch and a length of each is longer than a distance between each pair of front and rear driven rollers 19 and 20. An interval D between each pair of front and rear driven rollers 19 and 20 is set to an integral multiple of the feed pitch in common to the respective screw shafts 21 to 23. As shown in FIG. 5 and FIG. 6, the interval D between each pair of front and rear driven rollers 19 and 20 is configured so as not to be shorter than each of rectilinear distances between end portions of the screw shafts 21 and 23 positioned at respective front and rear sides of the upper end arcuate portion 5A and between end portions of the screw shafts 23 and 22 positioned at respective front and rear sides of the lower end arcuate portion 5B so that when each conveying traveling body 2 passes through each of the upper and lower arcuate portions 5A and 5B, the driven roller 19 at the front side engages with a screw shaft 23 or 22 at a downstream side before the driven roller 20 at the rear side disengages from the screw shaft 21 or 23 at an upstream side. Phases of spiral grooves of the respective screw shafts 21 to 23 are matched completely so that the driven roller 19 at the front side can smoothly engage with and enter inside the spiral groove of the screw shaft 23 or 22 at the downstream side.

To describe specifically further, if, as shown in FIG. 1, a region, between two virtual lines passing from an arc center of each of the upper and lower arcuate portions 5A and 5B through respective ends of each of the upper and lower arcuate portion 5A and 5B in side view, is denoted as a fan-shaped region SA, then as shown in FIG. 5 and FIG. 6, when each conveying traveling body 2 travels from the upper horizontal route portion 3 to the gradient route portion 5 or from the gradient route portion 5 to the lower horizontal route portion 4, the driven rollers 19 and 20 move through rectilinear routes parallel to axial centers of the corresponding screw shafts among the respective screw shafts 21 to 23 and an arcuate route inside the corresponding fan-shaped region SA. Here, if, as shown in FIG. 5 and FIG. 6, end portions at the arcuate portion 5A and 5B sides of the respective screw shafts 21 to 23 are extended toward interiors of the fan-shaped regions SA, the driven rollers 19 and 20 moving inside the corresponding fan-shaped region SA will move in an obliquely arcuate shape with respect to the rectilinear portion of the fan-shaped region SA of the corresponding screw shaft among the respective screw shafts 21 to 23, and even if the driven rollers 19 and 20 are separated from the axial center of each of the screw shafts 21 to 23 in side view, as long as the driven rollers 19 and 20 become engaged at a depth of not less than a predetermined value with the spiral groove portion of the screw main body 35 of each of the screw shafts 21 to 23 when the screw shaft is viewed from an axial center direction, the driven rollers 19 and 20 will be able to receive thrust from each of the screw shafts 21 to 23 without any problem.

Therefore, with the present embodiment, by extending the end portions at the arcuate portion 5A and 5B sides of the respective screw shafts 21 to 23 within a range satisfying the abovementioned conditions and making the extended end portions be disposed inside the fan-shaped regions SA as shown in FIG. 5 and FIG. 6, a rectilinear distance L1 between the end portions of the respective screw shafts 21 to 23 at the arcuate portion 5A or 5B sides is made significantly shorter than a rectilinear distance L2 between intersections P at which the respective screw shafts 21 to 23 contact the fan-shaped region SA to thereby narrow the interval D between the pair of front and rear driven rollers 19 and 20 within a range such that when each conveying traveling body 2 travels through each of the upper and lower arcuate portions 5A and 5B of the gradient route portion 5, the driven roller 19 or 20 can be engaged with and receive the thrust from one of either of the screw shafts 21 and 23 or one of either of the screw shafts 23 and 22. In other words, the interval D between the pair of front and rear driven rollers 19 and 20 is set to a length that is shorter than the rectilinear distance L2 between the intersections P but not shorter than the rectilinear distance L1 between the end portions of the respective screw shafts 21 to 23 at the arcuate portion 5A or 5B sides.

With the conveying device of the configuration described above, the driving motor 26 is put in operation to rotatingly drive the respective screw shafts 21 to 23, which are interlockingly coupled to each other, in the predetermined direction at the predetermined speed. When a conveying traveling body 2 is then sent, by a suitable travel driving means to be described later, into a position at which the front side driven roller 19 can engage with the upper horizontal screw shaft 21 of the upper horizontal route portion 3, the front side driven roller 19 is drawn in by the upper horizontal screw shaft 21 due to the rotation of the upper horizontal screw shaft 21 so that the conveying traveling body 2 travels forward. Thereafter, the rear side driven roller 20 also engages with the upper horizontal screw shaft 21 so that at least one of the pair of front and rear driven rollers 19 and 20 receives the thrust from the upper horizontal screw shaft 21 and the conveying traveling body 2 continues to travel forward.

When the conveying traveling body 2 enters inside the upper end arcuate portion 5A of the gradient route portion 5, the front side driven roller 19 disengages forward from the upper horizontal screw shaft 21 and the conveying traveling body 2 continues to travel forward by the thrust that the rear side driven roller 20 receives from the upper horizontal screw shaft 21. As also shown in FIG. 5, at the upper end arcuate portion 5A, the pair of front and rear trolleys 11 and 12 can travel smoothly along the convexly curved guide rails 1 at the upper end arcuate portion 5A while being kept oriented along the guide rails 1 by the respective trolleys 11 and 12 tilting around the horizontal support shafts 16 with respect to the conveying traveling body 2. As shown in FIG. 5, by the conveying traveling body 2 continuing to travel along the upper end arcuate portion 5A, the rear side driven roller 20 moves, in the form of an arc that curves concentric to the upper end arcuate portion 5A, inside a terminal end side region of the upper horizontal screw shaft 21 that enters rectilinearly inside the fan-shaped region SA of the upper end arcuate portion 5A, and until the rear side driven roller 20 disengages from the terminal end of the upper horizontal screw shaft 21, the rear side driven roller 20 receives the thrust from the upper horizontal screw shaft 21 reliably and the travel of the conveying traveling body 2 is continued without any problem as described above.

When the travel of the conveying traveling body 2 proceeds and the rear side driven roller 20 becomes detached from the terminal end of the upper horizontal screw shaft 21, the front side driven roller 19 will already be engaged with a starting end portion of the subsequent inclined screw shaft 23, that is, inside a starting end portion region of the inclined screw shaft 23 that enters rectilinearly inside the fan-shaped region SA of the upper end arcuate portion 5A. The conveying traveling body 2 thus continues to travel forward by the thrust acting on the front side driven roller 19 from the inclined screw shaft 23. Even in this state, the front side driven roller 19 moves, in the form of an arc that curves concentric to the upper end arcuate portion 5A, inside the starting end portion region of the inclined screw shaft 23 that enters rectilinearly inside the fan-shaped region SA of the upper end arcuate portion 5A, and the front side driven roller 19 receives the thrust from the inclined screw shaft 23 reliably and the travel of the conveying traveling body 2 is continued without any problem as described above.

As described above, by the upper horizontal screw shaft 21, the inclined screw shaft 23, and the pair of front and rear driven rollers 19 and 20 that engage with these screw shafts, the conveying traveling body 2 is enabled to travel continuously and reliably from the upper horizontal route portion 3 to the inclined rectilinear portion 5C of the gradient route portion 5 via the upper end arcuate portion 5A of the gradient route portion 5. Although at the inclined rectilinear portion 5C of the gradient route portion 5, the conveying traveling body 2 tends to slip downward along the inclination due to gravity, at least one of the driven rollers among the pair of front and rear driven rollers 19 and 20 that is engaged with the inclined screw shaft 23 suppresses the slipping of the conveying traveling body 2 downward along the inclination beyond a feed speed of the inclined screw shaft 23 so that the conveying traveling body 2 travels downward along the inclination in the inclined rectilinear portion 5C of the gradient route portion 5 while being kept at the feed speed of the inclined screw shaft 23. Obviously, if the circumstances are such that the conveying traveling body 2 will not slip downward along the inclination due to gravity, the conveying traveling body 2 will travel downward along the inclination in the inclined rectilinear portion 5C at the predetermined speed by at least one of the driven rollers among the pair of front and rear driven rollers 19 and 20 receiving the thrust from the inclined screw shaft 23.

When the conveying traveling body 2 that travels downward along the inclination in the inclined rectilinear portion 5C of the gradient route portion 5 enters into the lower end arcuate portion 5B, the front side driven roller 19 becomes detached forward from the inclined screw shaft 23 and the conveying traveling body 2 continues to travel forward by the thrust that the rear side driven roller 20 receives from the inclined screw shaft 23. As also shown in FIG. 6, at the lower end arcuate portion 5B, the pair of front and rear trolleys 11 and 12 can travel smoothly along the convexly curved guide rails 1 at the lower end arcuate portion 5B while being kept oriented along the guide rails 1 by the respective trolleys 11 and 12 tilting around the horizontal support shafts 16 with respect to the conveying traveling body 2. As shown in FIG. 6, by the conveying traveling body 2 continuing to travel along the lower end arcuate portion 5B, the rear side driven roller 20 moves, in the form of an arc that curves concentric to the lower end arcuate portion 5B, inside a terminal end portion region of the inclined screw shaft 23 that enters rectilinearly inside the fan-shaped region SA of the lower end arcuate portion 5B, and until the rear side driven roller 20 disengages from the terminal end of the inclined screw shaft 23, the rear side driven roller 20 receives the thrust from the inclined screw shaft 23 reliably and the travel of the conveying traveling body 2 is continued without any problem as described above.

When the travel of the conveying traveling body 2 proceeds and the rear side driven roller 20 becomes detached from the terminal end of the inclined screw shaft 23, the front side driven roller 19 will already be engaged with a starting end portion of the subsequent lower horizontal screw shaft 22, that is, inside a starting end side region of the lower horizontal screw shaft 22 that enters rectilinearly inside the fan-shaped region SA of the lower end arcuate portion 5B. The conveying traveling body 2 thus continues to travel forward by the thrust acting on the front side driven roller 19 from the lower horizontal screw shaft 22. Even in this state, the front side driven roller 19 moves, in the form of an arc that curves concentric to the lower end arcuate portion 5B, inside the starting end portion region of the lower horizontal screw shaft 22 that enters rectilinearly inside the fan-shaped region SA of the lower end arcuate portion 5B, and the front side driven roller 19 receives the thrust from the lower horizontal screw shaft 22 reliably and the travel of the conveying traveling body 2 is continued without any problem as described above.

Through the processes described above, the conveying traveling body 2 travels continuously at a fixed speed from the upper horizontal route portion 3 to the lower horizontal route portion 4 via the gradient route portion 5, and the travel of the conveying traveling body 2 up to a region in which the upper horizontal screw shaft 21 of the upper horizontal route portion 3 is juxtaposed and the travel of the conveying traveling body 2 subsequent a region in which the lower horizontal screw shaft 22 of the lower horizontal route portion 4 is juxtaposed may be executed by any travel driving means. For example, a travel driving means of a screw drive type, configured by juxtaposing a motor-driven horizontal screw shaft, engaging with the pair of front and rear driven rollers 19 and 20 of the conveying traveling body 2, along entireties of the upper horizontal route portion 3 and the lower horizontal route portion 4, or of a conventionally well-known friction drive type, with which motor-driven friction drive wheels, each being put in press contact with a side surface of the friction-drive load bar 10 included in the conveying traveling body 2 illustrated in the present embodiment, are disposed, for example, at a flank of the traveling route at intervals not longer than a total length of the load bar 10, or of a chain driven type, utilizing a pusher-equipped conveyor chain that makes the conveying traveling body 2 travel forward by engaging with a dog 11a, protruded at a lower side of the front side trolley 11 illustrated in the present embodiment, etc., may be adopted.

Figure 9A:
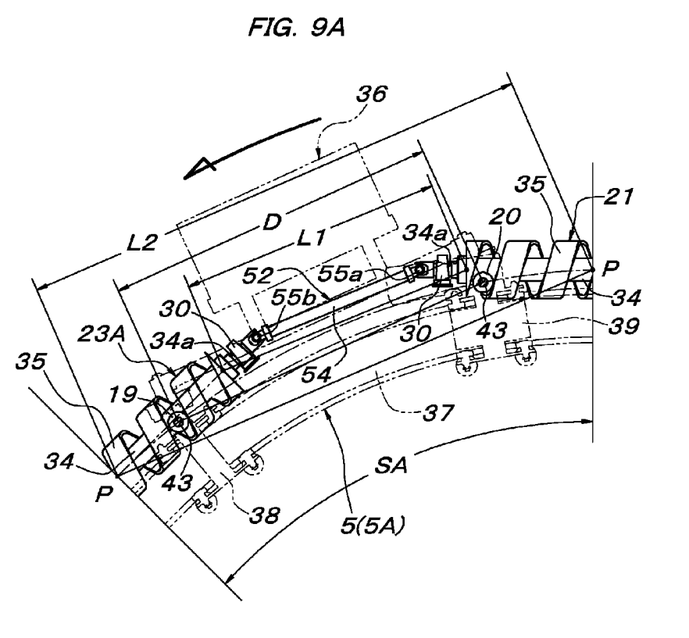
FIG. 9A is a side view for describing a configuration of an upper end arcuate portion of a gradient route portion.
Figure 9B:
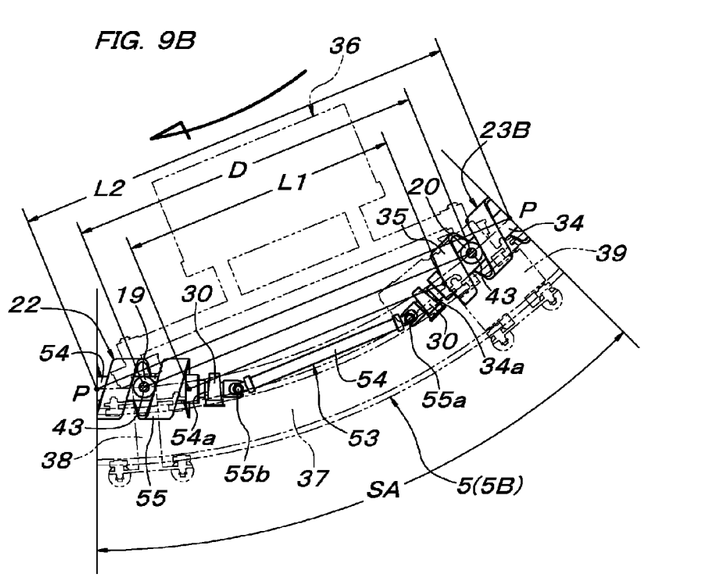
FIG. 9B is a side view for describing a configuration of a lower end arcuate portion of the gradient route portion.
Figure 10:
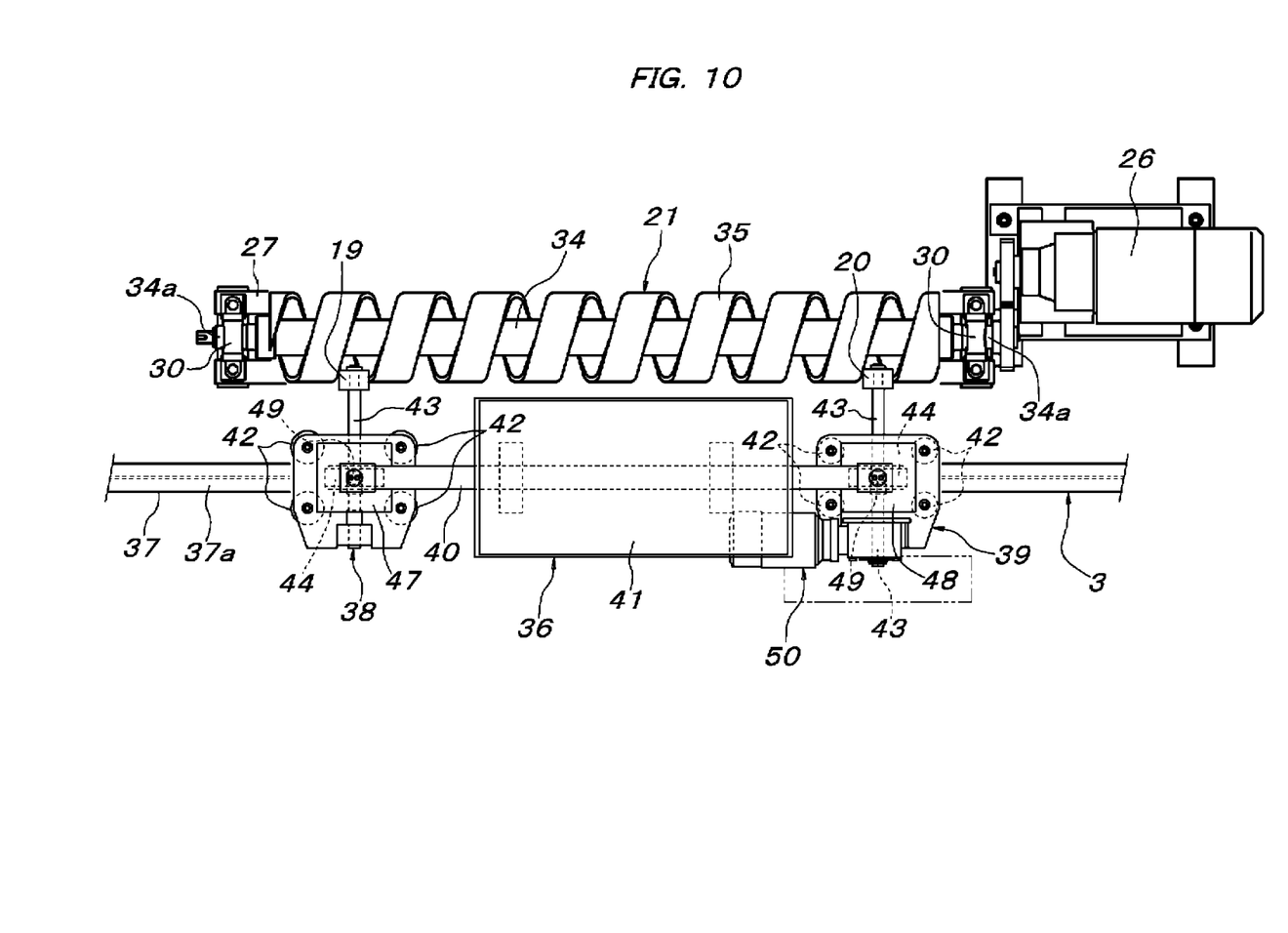
FIG. 10 is a plan view showing a conveying traveling body on the guide rail and a screw shaft.
Figure 11:
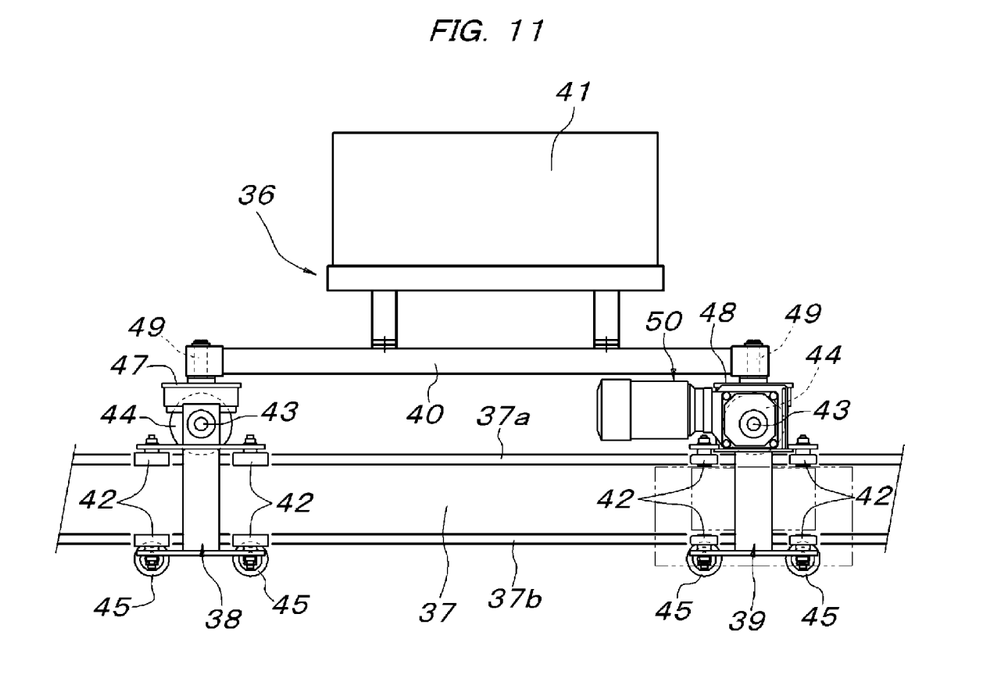
FIG. 11 is a side view showing the conveying traveling body on the guide rail.
Figure 12:
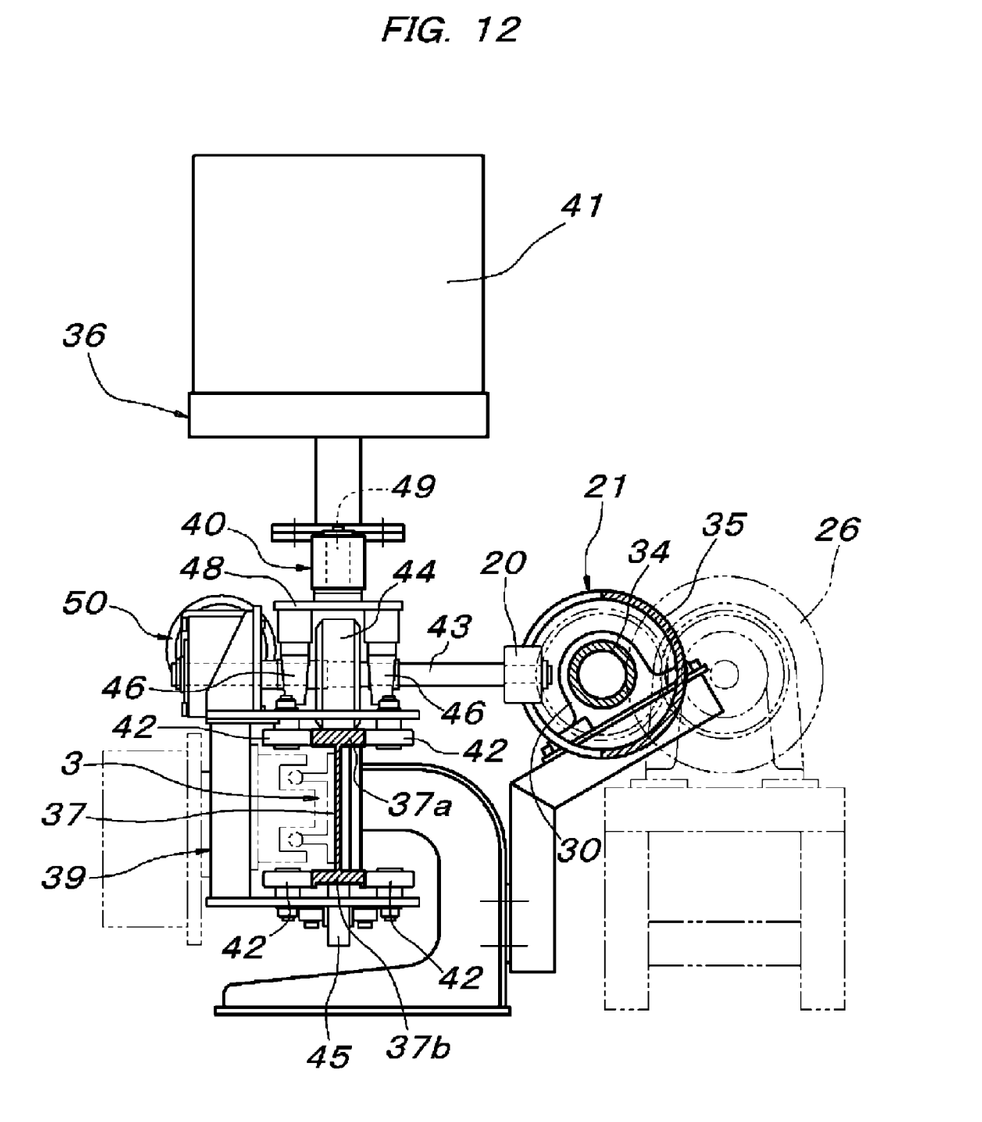
FIG. 12 is a longitudinal sectional rear view showing the conveying traveling body on the guide rail and the screw shaft.

Next, to describe an embodiment shown in FIG. 7A to FIG. 12, each conveying traveling body 36 illustrated in this embodiment travels while being supported on a single guide rail 37 with a cross-sectional shape of a horizontally laid H-steel beam and includes a pair of front and rear trolleys 38 and 39 and a main body 40, which is long in a front/rear traveling direction and has respective front and rear ends supported by the respective trolleys 38 and 39, and a conveyed object supporting portion 41 is provided on the main body 40 as shown in FIG. 10 to FIG. 12. Each of the pair of front and rear trolleys 38 and 39 includes two, front and rear sets of pairs of right and left positioning rollers 42 rotatable around vertical support shafts and sandwiching respective upper and lower horizontal rail portions 37a and 37b of the guide rail 37 from respective right and left sides, a wheel 44 rotatable around a right/left horizontal support shaft 43 and rolling on the upper horizontal rail portion 37a, and a pair of front and rear backup rollers 45 rotatable around right/left horizontal support shafts and contacting a lower surface of the lower horizontal rail portion 37b, the wheel 44 is positioned at a center of a quadrangular region surrounded by four positioning rollers 42 in plan view, and the pair of front and rear backup rollers 45 are provided at positions overlapping a pair of front and rear positioning rollers 42 at the lower side in side view. Both trolleys 38 and 39 are thus supported to be movable while being kept in fixed orientations with respect to the guide rail 37.

The pair of front and rear trolleys 38 and 39 are provided, at upper sides of the right/left horizontal support shafts 43 that bear the wheels 44, with frames 47 and 48, each of which is supported so as to be front/rear swingable around the corresponding right/left horizontal support shaft 43 via a pair of right and left bearings 46 disposed at respective right and left sides of the corresponding wheel 44, and respective front and rear end portions of the main body 40 are couplingly supported on the pair of front and rear frames 47 and 48 so as to be respectively relatively swingable horizontally around vertical support shafts 49. Therefore, at an arcuate route portion, at which the guide rail 37 curves in a vertical direction, the pair of front and rear trolleys 38 and 39 can respectively swing, with respect to the main body 40, around the right/left horizontal support shafts 43 that bear the wheels 44 and travel while being kept oriented along the guide rail 37, and at an arcuate route portion, at which the guide rail 37 curves horizontally, the pair of front and rear trolleys 38 and 39 can respectively rotate, with respect to the main body 40, around the vertical support shafts 49 and travel while being kept oriented along the guide rail 37.

Each conveying traveling body 36 illustrated in the present embodiment is provided with a driving motor unit 50 that rotatingly drives the wheel 44, which, among the wheels 44 respectively included in the pair of front and rear trolleys 38 and 39, is included in the trolley 39, via the right/left horizontal support shaft 43 bearing the corresponding wheel 44 and is configured to enable the conveying traveling body 36 to be self-propelled by the wheel 44 of the trolley 39 being driven to rotate by the driving motor unit 50. Further, the right/left horizontal support shafts 43 that bear the wheels 44 of the pair of front and rear trolleys 38 and 39 extend long in cantilevered manner to a side, opposite the side at which the driving motor unit 50 is disposed, so as to protrude to this one side of the conveying traveling body 36 in plan view, and the driven rollers 19 and 20 are supported, so as to be rotatable around the corresponding right/left horizontal support shafts 43, at distal ends of the extension to one side of the right/left horizontal support shafts 43.

A configuration and actions for making the conveying traveling body 36 of the above-described configuration travel continuously at a fixed speed in the gradient route portion 5 provided in the traveling route of the conveying traveling body 36 by means of the pair of front and rear driven rollers 19 and 20 and a screw shaft juxtaposed to the gradient route portion 5 are basically the same as the configuration and actions described for the former embodiment. A point of difference is the point that, due to the inclined rectilinear portion 5C of the gradient route portion 5 of the present embodiment being long in length and large in inclination angle, the inclined screw shaft 23 juxtaposed to the inclined rectilinear portion 5C of the gradient route portion 5 is configured by a plurality of, that is for example, two inclined screw shafts 23A and 23B that are interlockingly coupled to each other by a transmission means 51. Also, each of a transmission means 52, interlockingly coupling the upper horizontal screw shaft 21, juxtaposed to the upper horizontal route portion 3, and the upper side inclined screw shaft 23A, a transmission means 53, interlockingly coupling the lower side inclined screw shaft 23B and the lower horizontal screw shaft 22, and the transmission means 51, interlockingly coupling the inclined screw shafts 23A and 23B to each other, has a configuration where, as shown in FIGS. 9A and 9B, respective ends of an intermediate transmission shaft 54 are coupled, via universal joints 55a and 55b to the supporting shaft portions 34a of the screw shafts 21 and 23A or 23A and 23B or 23B and 22 positioned at the respective sides of the intermediate transmission shaft 54. Obviously, the same transmission means 24 and 25 illustrated in the former embodiment may be used as the transmission means 52 and 53. In the description that follows, the inclined screw shaft configured from the inclined screw shafts 23A and 23B is described as a single inclined screw shaft 23 as was done with the former embodiment.

Although the present embodiment is also configured so that at each of the respective upper and lower end arcuate portions 5A and 5B of the gradient route portion 5, the end portions of the screw shafts 21 and 23 or 23 and 22 at the respective sides enter inside the fan-shaped region SA, the regions in which the arcuately moving driven rollers 19 and 20 can engage at the predetermined depth inside the spiral grooves of the screw shafts 21 to 23 are shortened due to the large inclination angle of the inclined rectilinear portion 5C of the gradient route portion 5 in the present embodiment. Although the lengths of the end portion regions of the respective screw shafts 21 to 23 that enter inside the fan-shaped regions SA are thus shortened, by elongating the end portions of the screw shafts 21 and 23 or 23 and 22 at respective sides of each of the arcuate portions 5A and 5B toward the interior of the corresponding fan-shaped region SA and making the end portions enter inside the corresponding fan-shaped region SA by predetermined lengths, the interval D between the driven rollers 19 and 20 can made narrower than the rectilinear length L2 between the intersections P of the screw shafts 21 and 23 or 23 and 22 at the respective sides of each of the arcuate portions 5A and 5B and the corresponding fan-shaped region SA.

With the present embodiment, at a portion further upstream than the region in which the upper horizontal screw shaft 21 of the upper horizontal route portion 3 is juxtaposed and at a portion further downstream than the region in which the lower horizontal screw shaft 22 of the lower horizontal route portion 4 is juxtaposed, each conveying traveling body 36 is self-propelled by operation of the driving motor unit 50, and from the region in which the upper horizontal screw shaft 21 is juxtaposed to the region in which the lower horizontal screw shaft 22 is juxtaposed, the driving motor unit 50 is stopped, the wheel 44 to be driven by the driving motor unit 50 is switched to a freely rotating state, and as in the former embodiment, the respective screw shafts 21 to 23 are driven to rotate to make the conveying traveling body 36 travel continuously at the fixed speed by the thrust transmitted from the respective screw shafts 21 to 23 via the driven rollers 19 and 20 of the conveying traveling body 36. The action in this state of the driven rollers 19 and 20 engaging with each of the end portion regions of the respective screw shafts 21 to 23 that enter inside the fan-shaped regions SA and transmitting the thrust to the conveying traveling body 36 is as has been described with the former embodiment.

Although with each of the embodiments described above, it has been described that the conveying traveling body 2 or 36 is driven to travel from the upper horizontal route portion 3 to the lower horizontal route portion 4 of the gradient route portion 5, rotation directions of the respective screw shafts 21 to 23 may be changed to drive the conveying traveling body 2 or 36 to travel from the lower horizontal route portion 4 to the upper horizontal route portion 3 of the gradient route portion 5 as well. Further, the conveying traveling body is not restricted to a type with which a conveyed object is loaded at an upper side and may be of a type that suspendedly conveys a conveyed object. Also, the positions of the screw shafts 21 to 23 with respect to the traveling route of the conveying traveling body are not restricted to lateral side positions, and with a conveying traveling body of a type with which a conveyed object is loaded at an upper side, the screw shafts 21 to 23 may be juxtaposed to a lower side of the traveling route of the conveying traveling body, or with a conveying traveling body of a type that suspendedly conveys a conveyed object at a lower side, the screw shafts 21 to 23 may be juxtaposed to an upper side of the traveling route of the conveying traveling body. Obviously, even in such cases where the screw shafts 21 to 23 are juxtaposed to the lower side or the upper side of the traveling route of the conveying traveling body, the driven rollers 19 and 20 are not restricted to a configuration of being engaged in the vertical direction with respect to the screw shafts 21 to 23 and may be engaged in a right/left lateral direction with respect to the screw shafts 21 to 23 as in the embodiments described above.

The conveying device according to the present invention can be utilized as a conveying device, which, even when a gradient route portion, such that smooth and reliable travel cannot be performed readily by an ordinary travel driving means due to occurrence of slipping, is present in a traveling route of a conveying traveling body, is capable of making the conveying traveling body travel smoothly and reliably in the gradient route portion.

What is claimed is:

1. A conveying device, comprising:
    a traveling route of a conveying traveling body, the traveling route having upper and lower horizontal route portions and having a gradient route portion disposed between the upper and lower horizontal route portions, the gradient route portion having an inclined rectilinear portion and having arcuate portions disposed on respective ends of the inclined rectilinear portion, where the arcuate portions connect the gradient portion to the upper and lower horizontal route portions, rectilinear screw shafts disposed along the inclined rectilinear portion of the gradient route portion and along the upper and lower horizontal route portions, where the rectilinear screw shafts are interlockingly coupled to each other and driven by a motor, the conveying traveling body having, in a traveling direction of the conveying traveling body, a pair of front and rear driven rollers operable to engage with the screw shafts, an interval between the pair of front and rear driven rollers is not shorter than a rectilinear distance between an end portion of an inclined screw shaft disposed along the gradient route portion and an end portion of a horizontal screw shaft disposed along one of the upper and lower horizontal route portions, where the end portions of the inclined screw shaft and the horizontal screw shaft are positioned at respective sides of an arcuate portion at either of respective upper and lower ends of the gradient route portion so that the conveying traveling body travels continuously between the respective upper and lower horizontal route portions via the gradient route portion by means of each of the rotatingly driven screw shafts and at least one of the driven rollers, the end portion of the inclined screw shaft and the end portion of the horizontal screw shaft are extended so as to be disposed inside a fan-shaped region between two virtual rectilinear lines joining an arc center of the arcuate portion and respective ends of the arcuate portion in side view so that the rectilinear distance between the screw shaft end portions is shorter than a rectilinear distance between intersections at which the respective screw shafts contact the fan-shaped region, and the interval between the pair of front and rear driven rollers is shorter than the rectilinear distance between the intersections but not shorter than the rectilinear distance between the end portions of the screw shafts.

2. The conveying device according to claim 1, wherein the pair of front and rear driven rollers are pivotally supported at lateral portions of the conveying traveling body by horizontal support shafts directed orthogonal to the traveling direction of the conveying traveling body and the respective screw shafts are disposed along lateral sides of the conveying traveling body.

3. The conveying device according to claim 2, wherein:

the conveying traveling body includes a main body and a pair of front and rear trolleys that are supported to be movable while being kept in a fixed orientation with respect to a guide rail constituting the traveling route of the conveying traveling body, the respective trolleys are pivotally supported at a front and rear of the main body so as to be swingable around right-left laterally oriented horizontal support shafts, and the pair of front and rear driven rollers are pivotally supported by the main body at positions above the horizontal support shafts.

4. The conveying device according to claim 2, wherein:

the conveying traveling body includes a main body and a pair of front and rear trolleys that are supported to be movable while being kept in a fixed orientation with respect to a guide rail constituting the traveling route of the conveying traveling body, the respective trolleys are pivotally supported at a front and rear of the main body so as to be swingable to the front and rear around right-left laterally oriented horizontal support shafts, and the pair of front and rear driven rollers are supported by lateral side extension ends of the horizontal support shafts pivotally supporting the respective trolleys.

5. The conveying device according to claim 2, wherein:

the conveying traveling body includes a main body and a pair of front and rear trolleys that are supported to be movable while being kept in a fixed orientation with respect to a guide rail constituting the traveling route of the conveying traveling body, the respective trolleys are pivotally supported at a front and rear of the main body so as to be swingable to the front and rear around right-left laterally oriented horizontal support shafts, the pair of front and rear trolleys have wheels rollable on a supporting rail surface of the guide rail, and the wheels are concentric to the horizontal support shafts, at least one trolley among the pair of front and rear trolleys is provided with a motor rotatingly driving the wheel included in the trolley, and the conveying traveling body is configured to be capable of self-propulsion in the horizontal route portion in the traveling route by means of the motor-driven wheel, and the pair of front and rear driven rollers are pivotally supported concentrically to the wheels of the pair of front and rear trolleys.

* * * * *